United States Patent
Hammer et al.

[11] Patent Number: 5,358,784
[45] Date of Patent: Oct. 25, 1994

[54] TUBULAR FOOD CASING WITH IMPROVED PEELABILITY

[75] Inventors: Klaus-Dieter Hammer, Mainz-Mombach; Manfred Siebrecht; Hermann Winter, both of Wiesbaden, all of Fed. Rep. of Germany

[73] Assignee: Hoechst Aktiengesellschaft, Frankfurt am Main, Fed. Rep. of Germany

[21] Appl. No.: 846,171

[22] Filed: Mar. 5, 1992

[30] Foreign Application Priority Data

Mar. 7, 1991 [DE] Fed. Rep. of Germany ....... 4107238
Jun. 26, 1991 [DE] Fed. Rep. of Germany ....... 4121068

[51] Int. Cl.$^5$ .............................................. A22C 13/00
[52] U.S. Cl. .................... 428/34.8; 428/352; 428/536; 138/118.1; 426/105; 426/138; 426/140
[58] Field of Search ............... 428/34.8, 34.2, 219, 428/342, 352, 113, 536; 138/118.1; 426/105, 138, 140; 427/230

[56] References Cited

U.S. PATENT DOCUMENTS

| | | | |
|---|---|---|---|
| 2,136,566 | 11/1938 | Schnecko et al. | 18/57 |
| 2,901,358 | 8/1959 | Underwood et al. | 99/176 |
| 2,925,621 | 2/1960 | Parth | 18/57 |
| 3,451,827 | 6/1969 | Bridgeford | 99/176 |
| 3,494,773 | 2/1970 | Courts et al. | 99/176 |
| 3,679,435 | 7/1972 | Klenk et al. | 99/176 |
| 3,988,804 | 11/1976 | Regner et al. | 17/45 |
| 4,357,371 | 11/1982 | Heinrich et al. | 427/238 |
| 4,378,017 | 3/1983 | Kosugi et al. | 424/35 |
| 4,396,039 | 8/1983 | Klenk et al. | 138/118 |
| 4,410,011 | 10/1983 | Andrä et al. | 138/118.1 |
| 4,543,282 | 11/1985 | Hammer et al. | 428/36 |
| 4,563,376 | 1/1986 | Hammer et al. | 428/36 |
| 5,089,307 | 2/1992 | Ninomiya et al. | 428/35.2 |

FOREIGN PATENT DOCUMENTS

| | | |
|---|---|---|
| 2801038 | 7/1979 | Fed. Rep. of Germany . |
| 3447026 | 7/1985 | Fed. Rep. of Germany . |
| 5491614 | 11/1985 | Spain . |
| 1086604 | 10/1967 | United Kingdom . |
| 1201830 | 12/1970 | United Kingdom . |

*Primary Examiner*—Charles R. Nold
*Attorney, Agent, or Firm*—Foley & Lardner

[57] ABSTRACT

A tubular food casing based on cellulose, which on its inner surface has a coating which comprises lecithin and at least one of alginate, chitosans, and casein, has improved peelability from its contents.

14 Claims, No Drawings

TUBULAR FOOD CASING WITH IMPROVED PEELABILITY

BACKGROUND OF THE INVENTION

The present invention relates to a tubular food casing based on cellulose, which on its inner surface is provided with a coating which improves the peelability of the casing from its contents, and to the use of said food casing.

Casings of the above generic type are known, for example, from EP-A-109,611, in which casings whose inner surfaces are provided with a coating comprising a mixture of a water-soluble cellulose ether, a wax and an oil are described. The inner coating of a casing of the same generic type, which is known from DE-A-34 47 026, comprises, in addition to a chromium/fatty acid complex compound and a dialkylpolysiloxane, also cellulose ether and wax. However, all known preparations used for improving the peelability are of relatively complicated composition and are not yet fully satisfactory, in particular, when being stuffed with relatively problematic goods.

A coating composition for cellulose casings, which contains lecithin and a cellulose ether, is known from ES-B-549,161.

SUMMARY OF THE INVENTION

It was the object of the instant invention to provide a food casing which is internally coated with a coating composition comprising as few individual components as possible, but which nevertheless offers a wide application range in respect of easy peelability from goods of various compositions.

Another object of the invention is to provide a process for producing the above described casing.

It is also an object of the invention to provide a coating composition which can be used to coat the inside of a food casing so as to produce a casing having improved peelability.

In accomplishing the foregoing objective, there has been provided, in accordance with one aspect of the present invention, a tubular food casing comprising cellulose and a coating on the inner surface of the casing which improves the peelability of the casing from its contents, the coating comprising lecithin and at least one substance selected from the group consisting of alginates, chitosans, and casein.

In accordance with another aspect of the present invention there has been provided a process for producing a tubular food casing which comprises the step of coating a tubular casing comprising cellulose with an aqueous coating composition comprising lecithin, and at least one of an alginate, chitosan, and casein, so as to produce a casing which has improved peelability from its contents.

In accordance with another object of the present invention there has been provided a coating composition comprising lecithin and at least one of alginates, chitosan, and casein.

Further objects, features, and advantages of the present invention will become apparent from the detailed description of preferred embodiments that follows.

DETAILED DESCRIPTION OF THE PREFERRED EMBODIMENTS

The food casing of this invention preferably is a synthetic sausage casing. The special coating applied to the inner surface of the casing leads to a reduced adhesion between the inner casing wall and the stuffing compositions typically employed for medium-diameter and large-diameter casings and for ring casings. Such stuffing is particularly sausage meat for various kinds of blutwurst-type sausages, such as black-pudding or brawn; for cooked sausages, such as finely minced pork sausage; mortadella; or yellow-skin sausage. Also uncooked, minced sausage compositions are used, such as spreadable pork sausage, whereby curved or ring-type casings without fiber reinforcement are preferably used for the latter type of sausage.

The base material for the support tubing of the casing is cellulose. Any material based on cellulose can be used, such as transparent cellulose film, regenerated cellulose, and cellulose hydrate. The casing is produced in any known manner, preferably as a seamless tubing in the customary manner by coagulation and regeneration, preferably from a viscose solution. It is also possible to employ tubings having a glued seam, which are obtained by folding a web and joining the edges, such as described in EP-A-50,702 and EP-A-58,240. If the casing is used for producing blutwurst-type or scalded sausages, which is a particularly preferred use, a fiber-reinforced cellulose support tubing is preferably used. The reinforcement may, for example, be a paper web which is incorporated in the tubing wall. For producing curved or ring-shaped sausages, which are generally uncooked sausages, particularly coarse spreadable sausages, curved tubings or so-called ring casings are used, which are not fiber reinforced. The curvature is obtained, for example, during the production of the tubing, but other processes are also known and useful as described in, for example, U.S. Pat. No. 2,136,566, U.S. Pat. No. 2,925,621, U.S. Pat. No. 3,679,435 and EP-A-050,702.

The casings may be stuffed in any known manner, for example, the casing can be present in the laid-flat state, i.e., either wound up on a roll or in the form of individual tube sections tied off at one end and then stuffed. It is also possible to use the casings as shirred tubings, which are also called concertinas, and which are produced by means of customary shirring devices, such as described In U.S. Pat. No. 3,988,804.

It has been found that the inner coating of this invention not only results in a reduced adhesion between the inner casing wall and the sausage meat, but that additional advantages are achieved with regard to winding, storing, shirring, and further processing. Due to the inner coating the tubing walls of wound-up casings do not stick together. Cut-to-size tubing sections do not stick together even when they are stored over a relatively long period, and they can be opened without problem prior to being stuffed with sausage meat, in particular, on automatic stuffing devices. Furthermore, the tubings are distinguished by particularly good sliding properties and softness and can therefore be shirred without problem.

In accordance with this invention, the coating contains lecithin and at least one of alginate, chitosan and casein. Any amount of these components can be used so long as the desired results, such as improved peelability, are obtained. Lecithin is a member of the group of phosphatides where the phosphoric acid is esterified with choline on the one hand and with glycerol on the other hand, with the remaining hydroxyl groups of the glycerol itself being in turn esterified with long-chain fatty acids. Lecithin is a natural product, and due to the diversity of the fatty acid radicals, in most cases mixtures are obtained in the course of its extraction from biological matter. Due to the quaternary ammonium group of the choline radical, the substance has a high affinity towards the cellulose hydrate of the inner casing wall. Therefore, it can be applied easily and adheres well to the casing.

Apart from lecithin, the coating composition according to this invention furthermore contains alginate, preferably Na-alginate, or chitosan, or casein or a mixture comprising two or more of these substances. Combinations of lecithin and alginate and of lecithin and casein are preferred. Alginates are salts of alginic acid, in particular the alkali metal and alkaline earth metal salts thereof. Alginic acid itself is a colorless carboxyl group-containing polysaccharide having a mean molecular weight of between 100,000 and 240,000. Chemically, alginic acid is composed of 1,4-glycosidically linked D-mannuronic acid units, with occasional sections of alpha-glycosidically linked L-guluronic acid units. Alginic acid is a natural product which is present in brown algae in considerable amounts.

Chitosans are a group of compounds derived from naturally occurring chitin. They are obtained by desacetylation and partial depolymerization of chitin with the aid of strong alkalis. Chemically, they are $\beta$-glycosidically linked poly-N-acetyl glucosamines whose acetyl groups are hydrolysed to a greater or lesser extent as a result of the action of the strong alkalis. The chitosans generally have a mean molecular weight of about 400,000.

Casein belongs to the group of lactoproteins, so-called lactalbumins, and is a phosphoprotein which is present in milk as a soluble calcium salt. The chemical structure of the casein is such that the phosphoric acid is linked to a free OH group via an ester-type bond. This phosphoric acid group can be split off without difficulty, for example with soda lye.

In accordance with the invention, the applied amount of coating is preferably in the range of 200 to 900 mg/m$^2$, more preferably in the range of 400 to 800 mg/m$^2$, relative to the dry weight of the casing. Coating is performed in any known manner, preferably from an aqueous coating composition having a lecithin concentration in the range of 6 to 15% by weight, preferably of 8 to 12% by weight, relative to the total weight of the coating solution. Casein is preferably added in an amount of 1 to 5% by weight when used, and alginate and chitosan are preferably added in amounts of 1 to 3% by weight each when used, each time related to the total weight of the aqueous coating composition.

The food casing according to this invention is produced employing one of the processes customarily used for the production of food casings, in particular sausage casings which are based on cellulose and can be peeled off from their contents, particularly sausage meat, without difficulty.

The coating is applied to the inner surface of the tubular casing in any conventional manner, for example, by filling the tubular casing with coating liquid as described, for example, in GB-A-1,201,830, U.S. Pat. No. 2,901,358, DE-A-28 01 038, and DE-C-30 12 250, or by spraying the coating liquid into the tubular casing during the shirring process, e.g., through the hollow shirring mandrel, as described in U.S. Pat. No. 3,451,827. The coating temperature in general corresponds to the ambient temperature, i.e., it is between about 15 and about 30° C.

If the tubular casing is filled with the coating liquid, it is expedient to carry out this step during the production of the tubular casing, e.g., after the precipitation of the cellulose hydrate gel from viscose and prior to the drying step.

Tubular casings produced in accordance with this invention, which, in accordance with their intended use, are stuffed with sausage meat, and are then scalded and smoked, can be peeled off from their contents without any problem, using automatic peelers. The coating of this invention has been found to be suitable even for cooked sausages, such as finely minced pork sausage, and it is suited for practical use both in the case of non-reinforced cellulose casings and in the case of fiber-reinforced cellulose casings.

Very good results are also achieved with salami types requiring a long ripening time under mild conditions, that is, so-called Californian salami.

By the combination of lecithin with alginate and/or chitosan and/or casein, the adhesive properties of sausage casings, particularly of overwrapped or dip-coated long-life sausages, can be adjusted such that the easy peelability of the casings is maintained up to the end of the ripening process.

The invention will be illustrated in greater detail by means of the non-limiting examples which follow.

EXAMPLE 1

The inner surface of a fiber-reinforced sausage casing is impregnated with a solution comprising:
8.316 pbw (parts by weight) of water,
0.300 pbw of lactalbumin FN 4 (Royira),
0.400 pbw of glycerol,
0.167 pbw of 1 N soda lye,
0.017 pbw of glyoxal (40% strength),
0.800 pbw of lecithin 250 W.

The casing is stuffed with salami-type sausage meat. After a ripening time of about 8 days the salami is overwrapped with a protective plastics film. Then the sausage is stored for at least another three weeks. After this time it is still possible to remove without difficulty the casing carrying the impregnation according to this invention, whereas a casing provided with a purely adhesive impregnation, i.e., an impregnation produced without the addition of the lecithin/lactalbumin, can only be removed with difficulty and with lumps of sausage meat adhering to it.

EXAMPLE 2

The inner surface of a ring-shaped cellulose casing is provided with a peel impregnation comprising:
8.588 pbw of water,
0.200 pbw of Na-alginate (®Protacell 20, available from Protan, Norway),
1.200 pbw of lecithin 250 W,
0.012 pbw of Genapol x-080.

The casing is stuffed with coarse spreadable sausage meat and smoked. It can be easily peeled off both directly after the stuffing process and after a storage period of a number of days, without detachment of the casing from the unpeeled sausage being observed.

What is claimed is:
1. A tubular food casing useful for encasing contents and having an inner surface, comprising:
 a cellulose and a coating on the inner surface of said casing, wherein said coating improves the peelability of said casing from its contents, and wherein said coating comprises lecithin and at least one substance selected from the group consisting of alginates, chitosans, and casein.

2. A tubular food casing as claimed in claim 1, which is a sausage casing.

3. A tubular food casing as claimed in claim 1 wherein said cellulose is selected from at least one of the group consisting of transparent cellulose film, regenerated cellulose, and cellulose hydrate.

4. A tubular food casing as claimed in claim 1, wherein the casing is fiber reinforced.

5. A tubular food casing as claimed in claim 1, wherein said substance comprises an alginate.

6. A tubular food casing as claimed in claim 5, wherein said alginate comprises sodium alginate.

7. A tubular food casing as claimed in claim 1, wherein said substance comprises a chitosan.

8. A tubular food casing as claimed in claim 1, wherein said substance comprises casein.

9. A tubular food casing as claimed in claim 1, comprising about 200 to about 900 mg/m$^2$ of said coating based on the dry weight of said casing.

10. A tubular food casing as claimed in claim 9, comprising about 400 to about 800 mg/m$^2$ of said coating.

11. A tubular food casing as claimed in claim 1, wherein said coating is applied to said casing from an aqueous coating composition comprising about 6 to about 15% by weight of lecithin, relative to the total weight of the coating composition.

12. A tubular food casing as claimed in claim 11, wherein said aqueous coating composition comprises about 1 to about 5% by weight of casein, or about 1 to about 3% by weight of alginates or about 1 to about 3% by weight of chitosans, each percent relative to the total weight of the coating composition.

13. A tubular food casing as claimed in claim 1, wherein said coating consists essentially of lecithin and at least one of said substances.

14. A tubular food casing as claimed in claim 1, wherein the casing is ring-shaped and not fiber reinforced.

* * * * *